United States Patent [19]

Asahioka et al.

[11] Patent Number: 5,075,850
[45] Date of Patent: Dec. 24, 1991

[54] TRANSLATION COMMUNICATION SYSTEM

[75] Inventors: Yoshimi Asahioka; Hideki Hirakawa; Hiroyasu Nogami; Yumiko Yoshimura, all of Kanagawa, Japan

[73] Assignee: Kabushiki Kaisha Toshiba, Kawasaki, Japan

[21] Appl. No.: 329,208

[22] Filed: Mar. 27, 1989

[30] Foreign Application Priority Data

Mar. 31, 1988 [JP] Japan ................... 63-78834

[51] Int. Cl.⁵ ............................................. G06F 15/38
[52] U.S. Cl. .................................................. 364/419
[58] Field of Search ............... 364/419, 200 MS File, 364/900 MS File

[56] References Cited

U.S. PATENT DOCUMENTS

| | | | |
|---|---|---|---|
| 4,744,080 | 5/1988 | Hirosawa et al. | 364/419 X |
| 4,787,038 | 11/1988 | Doi et al. | 364/419 |
| 4,791,887 | 12/1988 | Doi | 364/419 |
| 4,831,829 | 5/1989 | Mike et al. | 364/419 |
| 4,882,681 | 11/1989 | Brolz | 364/419 |

Primary Examiner—Jerry Smith
Assistant Examiner—Russell E. Cass
Attorney, Agent, or Firm—Cushman, Darby & Cushman

[57] ABSTRACT

A translation communication system having memory means for storing past communication information and past translated information including as original word/translated word pair obtained from the communication information, and supply means for supplying the translated information useful for determining the translated word candidate to the translation means. With this construction, when the translation means translates a first language into a second language in conversation, the supply means retrieves the communication information in the first language from the memory means in accordance with the input original sentence in the first language, and supplies an original word/translated word pair in accordance with the retrieval result. Therefore, as the translated word in the second language, the present system uses the same word as the original word previously input by the other side's operator who uses the second language. Therefore, the other side's operator can receive a correctly translated answer from this side's operator who uses the first language.

22 Claims, 8 Drawing Sheets

| SENTENCE NUMBER (31) | ORIGINAL SENTENCE (32) | TRANSLATED SENTENCE (33) | TRANSLATED INFORMATION (34) |
|---|---|---|---|
| 1 | WATASHI WA SATO DESU. | I am Sato. | ⌈ORIGINAL WORD — TRANSLATED WORD ⌉<br>WATASHI — I<br>SATO — Sato<br>DESU — be<br><br>⌈SENTENCE STRUCTURE⌉<br>be ┬─ SUBJECT — I<br>    └─ COMPLEMENT — Sato |
| 4 | --- | --- | --- |
| 5 | --- | --- | --- |
| 6 | --- | --- | --- |

TRANSLATION COMMUNICATION SYSTEM

BACKGROUND OF THE INVENTION (1) Field of the Invention

The present invention relates to a system of communication between two parties which also performs translation.

(2) Description of the Prior Art

Recently, communication channels using computers have been developed. For example, communications are possible between online terminals with which several users transmit and receive information using displays. The terminals have a common host or are interconnected with a network. Development has also begun on a translation communication system in which such a communication system is combined with machine translation apparatus. This system is supposed to display transmitted or received natural language information between terminals after being translated, and is supposed to communicate natural language information smoothly for several users who speak different languages, respectively.

In such a translation communication system, however, translation processing should be performed in real time. Therefore, a user (transmitter) cannot edit his language information sufficiently as compared with normal machine translation apparatus. Moreover, conversation sentences to be translated include many omissions. Therefore, translation processing in the system lacks information for determining a translation for such incomplete sentences.

For this reason, if a communicated sentence is translated normally, it is difficult for a user (receiver) to understand the meaning of the translated sentence.

Specifically, translation communication systems should translate in real time. However, prior systems do not have sufficient information for selecting translated words if an incomplete sentence is input. Therefore, it is a problem as to how to translate conversation sentences exactly.

SUMMARY OF THE INVENTION

It is an object of the present invention to provide a translation communication system which can translate conversation sentences adequately.

In the present invention, past communication information (past original sentences and their translated sentences in a particular conversation) and translated information (a pair consisting of an original word and its corresponding translated word, and so on) are stored in memory means. When a present conversation sentence is translated, supply means retrieves useful information from past sentences in the conversation from the memory means and supplies the information to translation means.

As a result of this construction, when a conversation sentence includes an omission so that an original word may have many translated word candidates, the system is more likely to pick the correct candidate so that it is easy for a user (receiver) to understand the meaning of the translated sentence.

DESCRIPTION OF THE PREFERRED EMBODIMENT

Figure 1:
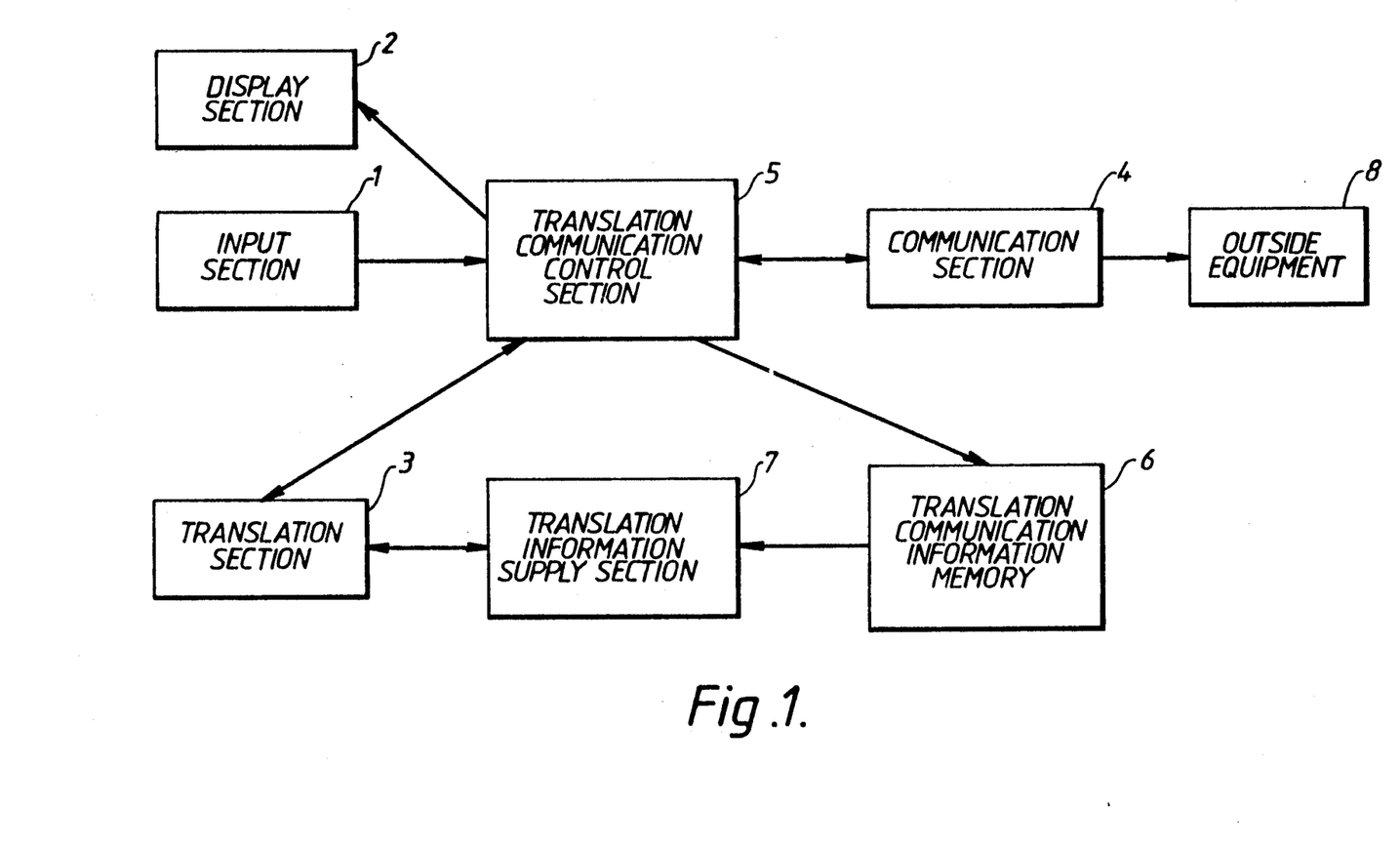
FIG. 1 shows a construction of a translation communication system according to one embodiment of the present invention.

FIG. 1 shows the construction of a translation communication system equipped at a communication terminal according to one embodiment of the present invention. This system will be explained as a mutual translation system between a first language "Japanese" and a second language "English".

This system comprises an input section 1 which may be a keyboard, a display section 2 for displaying characters, a translation section 3 for translating Japanese into English and English into Japanese, communication section 4 for transmitting and receiving information between outside equipment 8 (for example, another communication terminal or a host) and this system, translation communication control section 5, translation communication information memory 6 and translation information supply section 7, which supplies information for determining an adequate translated word.

The translation communication control section 5 transfers original sentences (Japanese) from the input section 1 to the display section 2 and the translation section 3, transfers corresponding translated sentences (English) from the translation section 3 to the communication section 4, transfers original sentences (English) from the communication section 4 through the outside equipment 8 to the translation section 3, and transfers corresponding translated sentences (Japanese) from the translation section 3 to the display section 2.

The translation communication information memory 6 stores communication information (comprising previous original sentences and their translated sentences) and translated information (comprising pairs of original words and their translated counterparts and so on) between Japanese and English. The translation information supply section 7 retrieves the communication information from the translation communication information memory 6 in accordance with an input original sentence transmitted to the translation section 3, and supplies a pair including an original word of the original sentence and its translated word in accordance with the retrieval result to the translation section 3 as information for determining an adequate translated word.

Figure 2A:
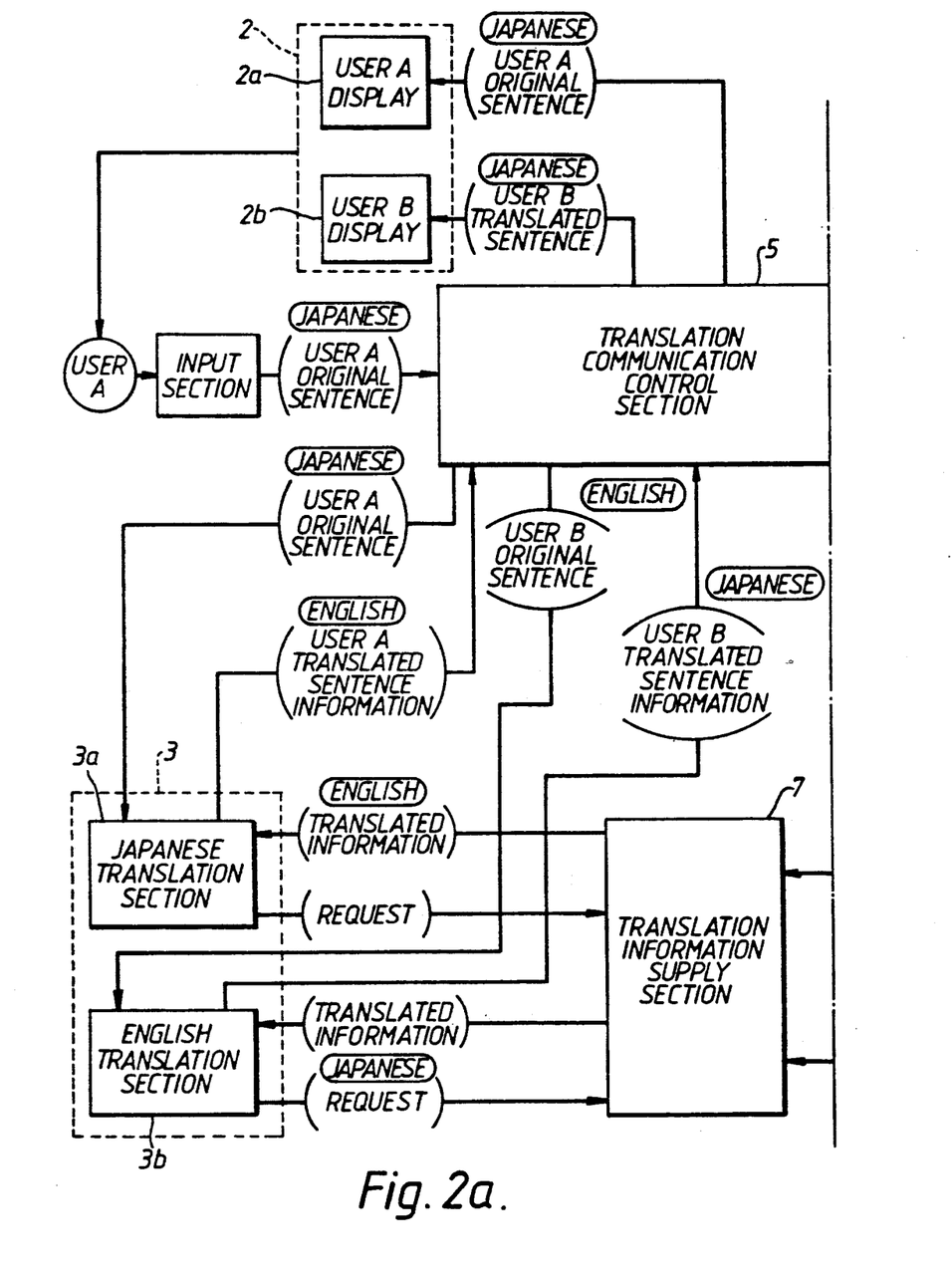
FIGS. 2(a) and 2(b) show details of each section and the flow of information in FIG. 1.
Figure 2B:
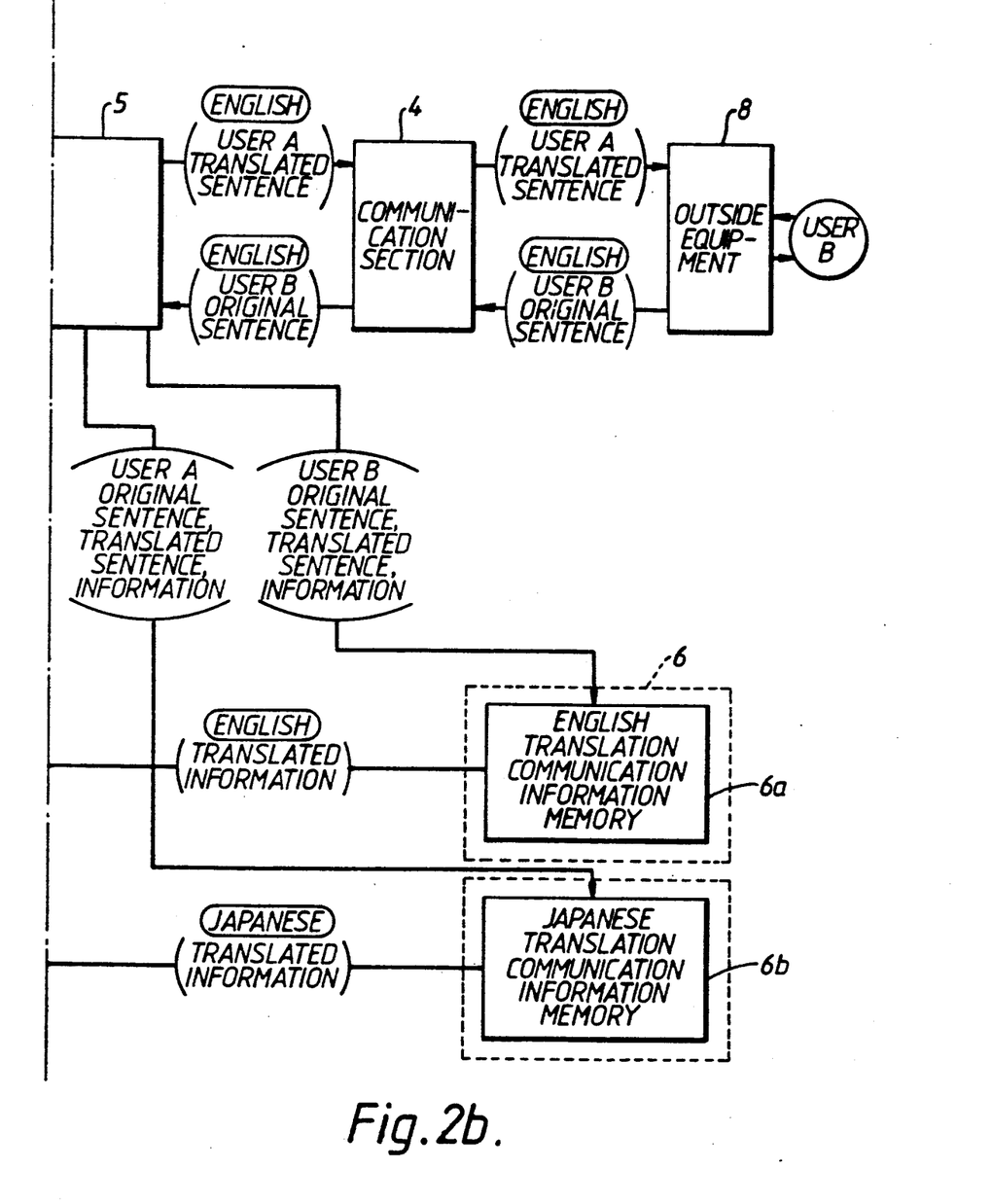

FIG. 2 shows the flow of information among each of the sections illustrated in FIG. 1. Display section 2 is composed of display portion 2a for displaying original sentences (Japanese) input through the input section 1 by user A who speaks Japanese, and display portion 2b for displaying translated sentences (Japanese) in correspondence with original sentences (English) input through the outside equipment 8 by user B who speaks English. Translation section 3 is composed of Japanese translation section 3a for translating Japanese into English, and English translation section 3b for translating English into Japanese. Translation sections 3a and 3b include well known translation dictionaries for initiating the translation process. Translation communication information memory 6 is composed of English translation information memory 6a being used by Japanese translation section 3a, and Japanese translation communication information memory 6b being used by English translation section 3b.

Next, the operation of each of the sections illustrated in FIG. 1 will be explained referring to FIG. 2. Suppose a Japanese sentence (original sentence by user A) is input from input section 1, and an English sentence (original sentence by user B) is input through communication section 4 from outside equipment 8. The Japanese sentence from input section 1, which was input by user A, is transferred to Japanese translation section 3a, display portion 2a and Japanese translation information memory 6a through translation communication control section 5. A translated English sentence (as a translated sentence, translated from the Japanese sentence) from Japanese translation section 3a is transferred to communication section 4 and Japanese translation communication memory 6b through translation communication control section 5. Japanese translation communication information memory 6b stores Japanese sentences (as past original sentences) and correspondingly translated English sentences (as past translated sentences in accordance with the past original sentence) respectively, and Japanese words (as original words in the past original sentences) and correspondingly translated English words (as translated words, in the past translated sentences, in accordance with the original words) respectively, as will be seen later. When Japanese translation section 3a begins to translate a present original sentence, when its internal dictionary is incapable of accurate translation, translation information supply section 7 receives the present original sentence (Japanese) from Japanese translation section 3a, and retrieves information stored in English translation communication information memory 6a according to the present original sentence. Section 7 selects information for determining an adequate translated word and supplies it to Japanese translation section 3a. In the same way, an English sentence (as original sentence) from communication section 4 is processed.

Figure 3:
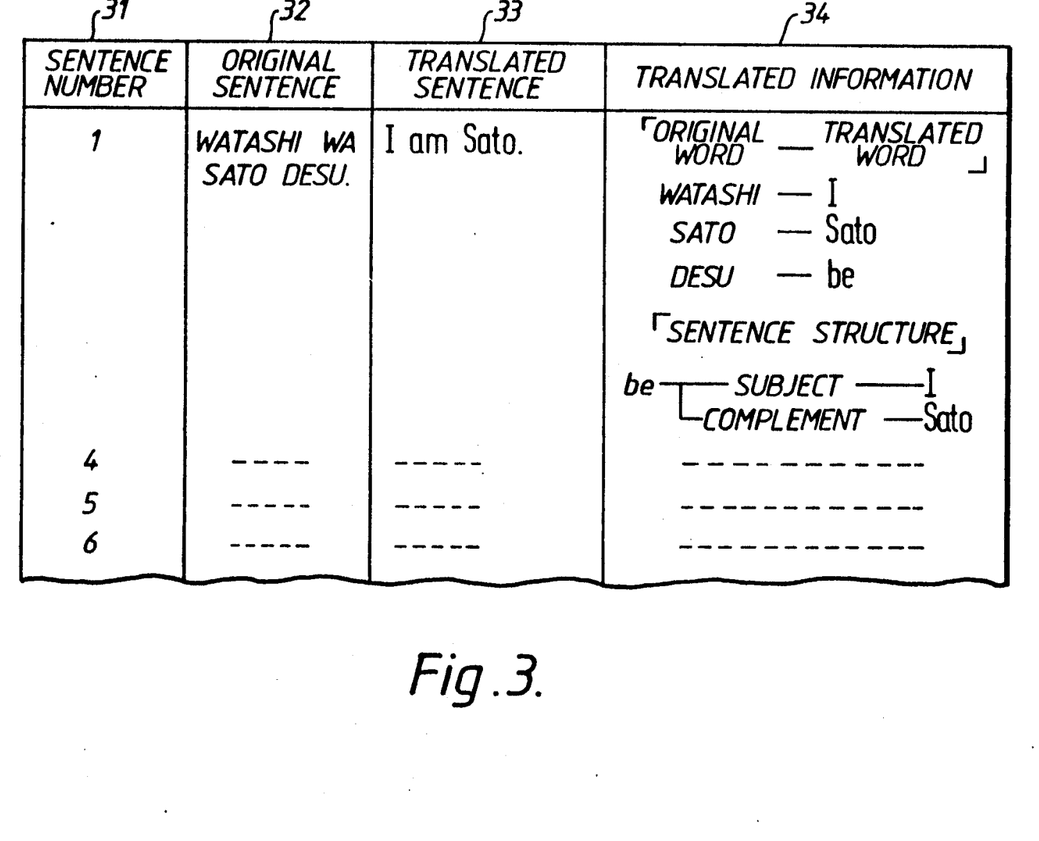
FIG. 3 shows information stored in the Japanese translated information memory in FIG. 2.

FIG. 3 shows detailed information stored in Japanese translation communication information memory 6b. This memory stores communication information including original sentences 32 and translated sentences 33 in accordance with the original sentences, translated information 34 and sentence number 31. In this case, the original sentences are in Japanese and the correspondingly translated sentences are in English.

For example, when original sentence "WATASHI WA SATO DESU" (in Japanese meaning "I am Sato") is input, "WATASHI WA SATO DESU", as an original sentence, is stored in area 32, and "I am Sato" as its translated sentence is stored in area 33. At the same time, pairs of original words and their correspondingly translated words, e.g., "WATASHI-I", "SATO-Sato", and "DESU-be", and sentence structure information "subject-I, complement-Sato, predicate-be" are stored as translated information 34. Sentence number information 31 represents the input order of each original sentence in a conversation between user A and user B.

In the same way, English translation communication information memory 6a stores communication information comprised of English sentences (as original sentences) and Japanese sentences (as their correspondingly translated sentences), and translated information including sentence structure information, pairs of original words and their correspondingly translated words.

Figure 4A:
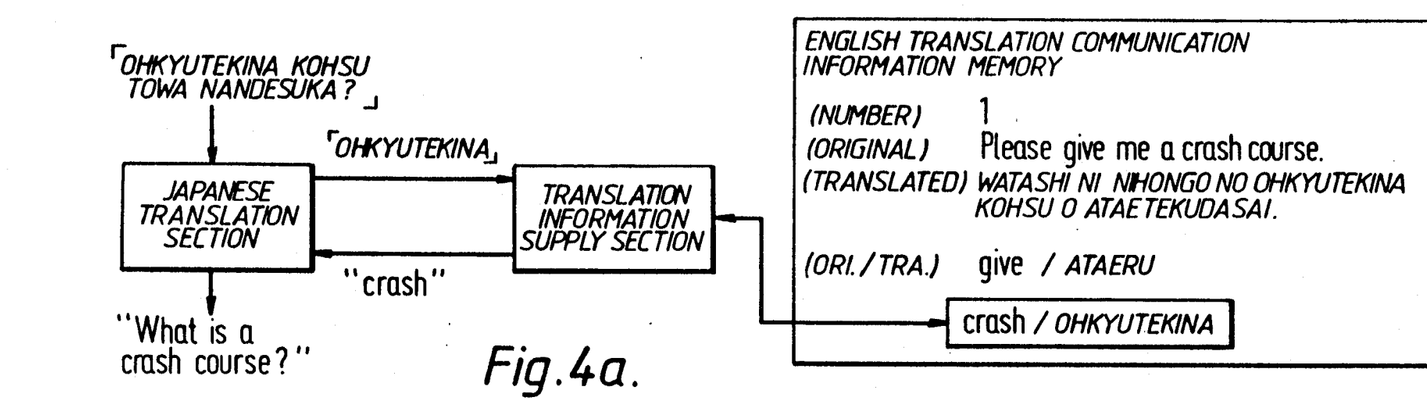
FIGS. 4(a), 4(b) and 4(c) show concrete examples of processing by the translation information supply section according to one embodiment of the present invention.

Next, the processing of translation information supply section 7 will be explained referring to FIGS. 4(a)-4(c). To begin with, as the first example as shown in FIG. 4(a), user B inputs the original sentence "Please give me a crash course in Japanese.", and its translated sentence (in Japanese) "WATASHI NI NIHONGO NO OHKYUTEKINA KOHSU O ATAETEKUDASAI." is displayed on user A's display section. The translation may be prepared, for example, using the conventional dictionary in English translation section 3b. At the same time, the original sentence, its translation, etc. are stored in English translation communication information memory 6b. After looking at this Japanese sentence, user A inputs Japanese sentence "OHKYUTEKINA KOHSU TOWA NANDESUKA?" as a question.

When the Japanese sentence is input to Japanese translation section 3a, the section 3a transfers the sentence to translation information supply section 7. The supply section 7 retrieves from English translation communication information memory 6a the past translated sentence with the largest sentence number having the original word "OHKYUTEKINA". It is necessary to consult memory 6a because the dictionary in translation section 3a includes several translated word candidates. Section 7 finds "OHKYUTEKINA" as a translated word in the translated sentence stored in memory 6a, extracts the original word "crash" corresponding to the translated word "OHKYUTEKINA" from translated information having the same sentence number, and transfers "OHKYUTEKINA-crash" as an original word/translated word pair to Japanese translation section 3a. After the pair is input in Japanese translation section 3a, section 3a selects "crash" as an adequate translated word for "OHKYUTEKINA" instead of "emergency" (which is the first translated word for "OHKYUTEKINA" in a regular Japanese-English dictionary such as contained in memory 3a), and generates a translated sentence "What is a crash course?."

Figure 5A:
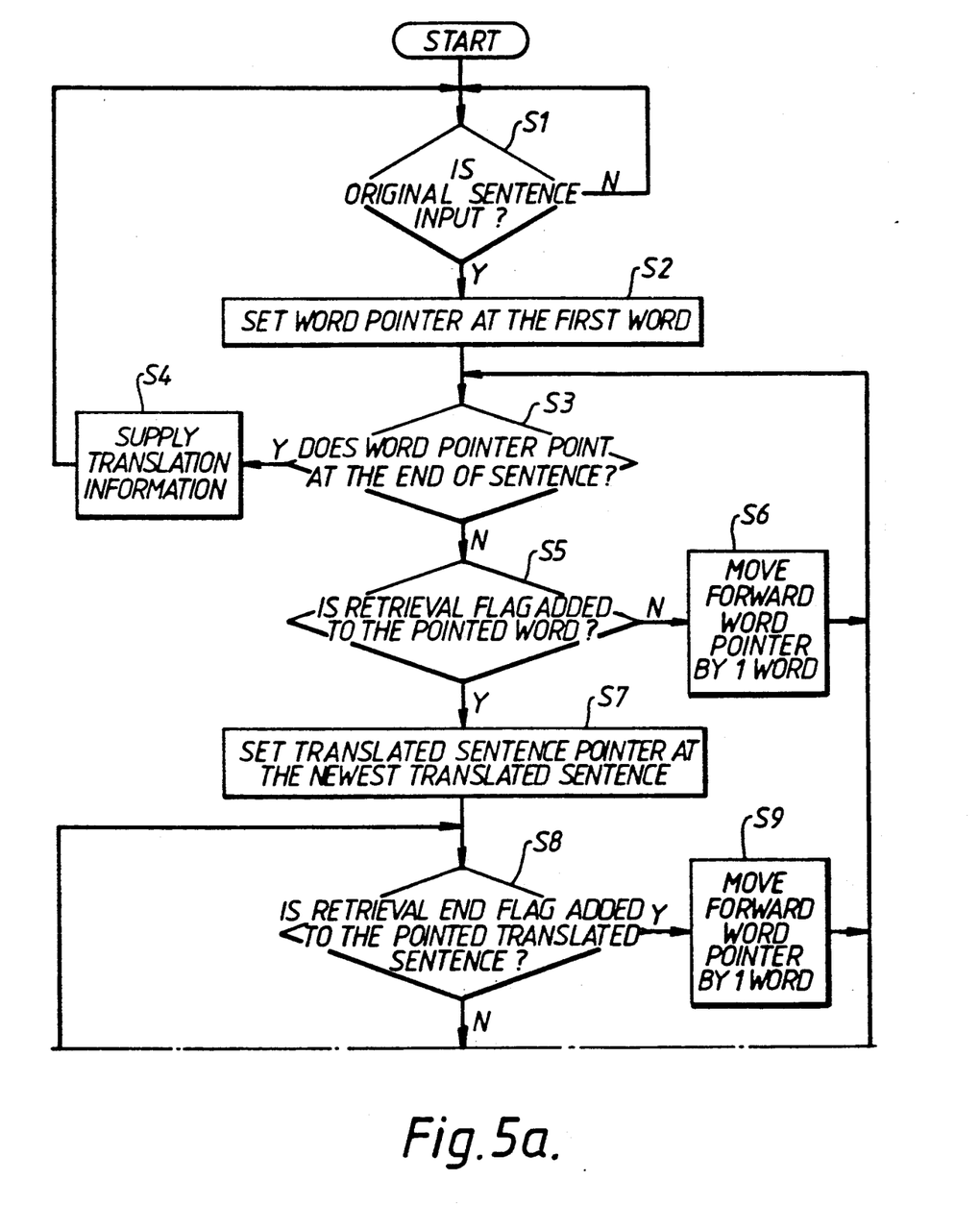
FIGS. 5(a) and 5(b) show a flow chart for detailed processing in accordance with FIG. 4(a).
Figure 5B:
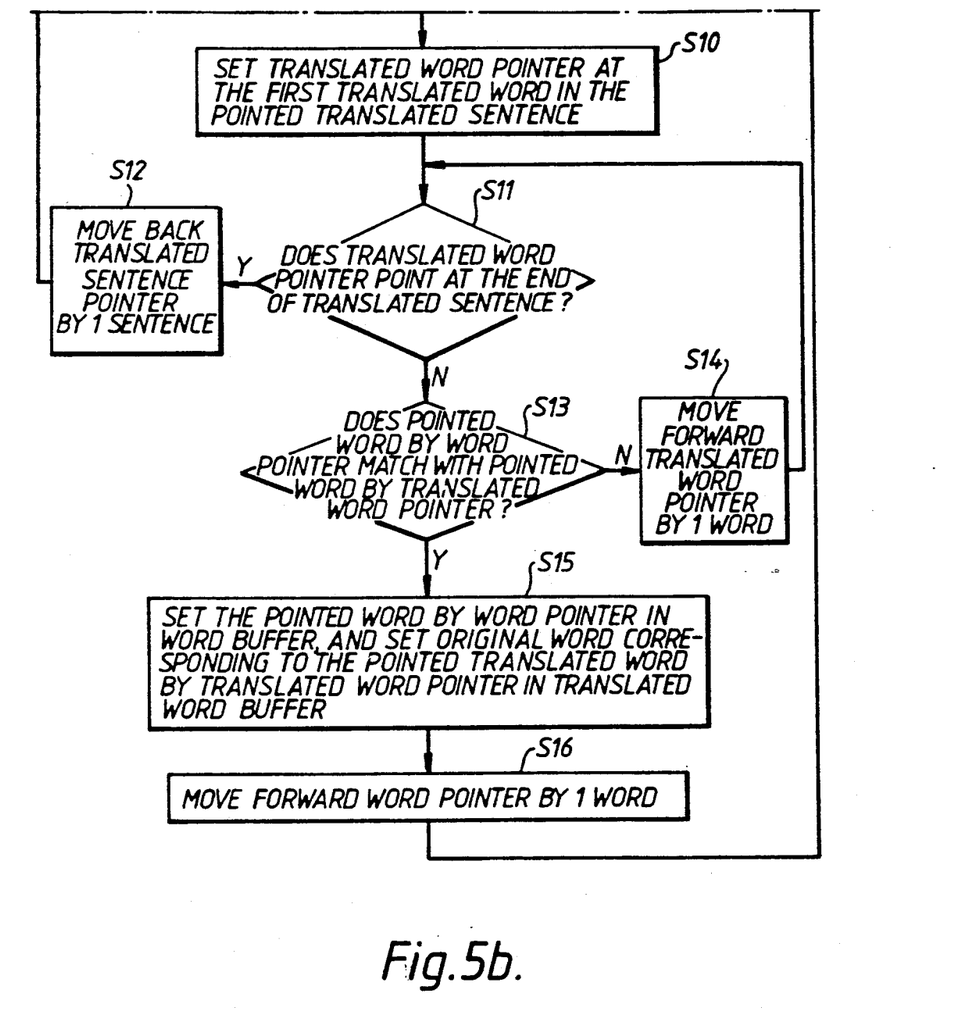

FIG. 5 shows a flow chart of the detailed processing necessary for FIG. 4(a). At first, when an original sentence is input, a word pointer is set at the first word in the original sentence, and it is checked whether the word pointer points to the end of the original sentence (S1,S2,S3). If the word pointer points to the end of the original sentence, already obtained translation information is supplied (S4), and the processing is returned to S1. If the word pointer does not point to the end of the original sentence, it is checked whether a retrieval flag has been added to the word pointed to by the word pointer (S5). If the retrieval flag is not added, the word pointer is moved forward by one word in the original sentence (S6), and the processing is returned to S3. The retrieval flag is added to the original word by translation section 3 when translation by a dictionary alone is not sufficient and translation information from prior communications is needed. Such situations occur depending on the part of speech of the word and whether the word has many translated word candidates.

If the retrieval flag has been added, a translated sentence pointer is set at the translated sentence having the largest sentence number stored in translation communication information memory 6, and it is checked whether retrieval end flag is added to the translated sentence pointed to by the translated sentence pointer (S7, S8). The reason why the translated sentence pointer is set at the largest sentence number is that translation information should be extracted from the newest translated sentence in past conversation. Older translated sentences having smaller sentence numbers may often include the word presently being translated. However, the earlier translation of that word may not have been ideal. If the translation of the word was used by the native language user in a more recent sentence, usually that translation is preferable. Therefore, the retrieval end flag is added to older translated sentences having smaller sentence numbers, for example, sentences having sentence numbers less than the third sentence number from the largest sentence number in numerical reverse order. These sentences without the retrieval end flag may be referred to as the immediately previous sentences.

If the retrieval end flag is added to the translated sentence pointed to by the translated sentence pointer, the word pointer is moved forward by one word in the original sentence (S9), and the processing returns to S3. If the retrieval end flag is not added to the translated sentence pointed to by the translated sentence pointer, the translated word pointer is set at the first word in the pointed translated sentence (S10).

Next, it is checked whether the translated word pointer points to the end of the pointed translated sentence (S11). If so, the translated sentence pointer is moved back (decreased) by 1 sentence among the past translated sentences (S12), and the processing returns to S8. If the translated word pointer does not point to the end of the pointed to translated sentence, it is checked whether the word pointed to by the word pointer matches the word pointed to by the translated word pointer (S13). If it does not match, the translated word pointer is moved forward by 1 word (S14) and the processing returns to S11. If it matches, the word pointed to by the word pointer is stored in a word buffer and the original word corresponding to the pointed to translated word is stored in a translated word buffer (S15). (The word buffer and the translated word buffer are not illustrated.) Then the word pointer is moved forward by 1 word (S16) and the processing returns to S3. The original word stored in the translated word buffer is used as the translation of the word in the original sentence pointed to by the word pointer.

Thus, an important concept of this invention is that sentences input by a native speaker in his language are stored during a conversation along with a translation of the sentence. Presumably, the native language sentence is a proper sentence in the native language even if the translation may not be perfect. Then, when a translation is desired into the native language, the native language sentence previously stored is the source of the translation. This helps to ensure that the translation into the native language is as correct as possible.

Figure 4B:
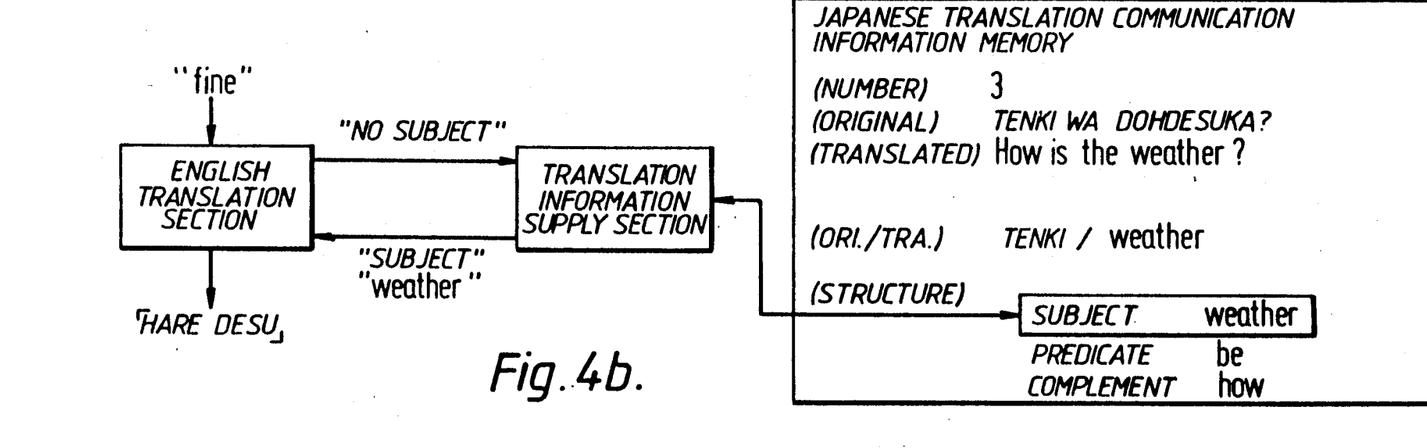

Next, as the second example in FIG. 4(b), user A inputs the original sentence (Japanese) "TENKIWA DOHDESUKA?" and its translation (English) "How is the weather?" is displayed on user B's display section employing conventional translation techniques. After looking at this English sentence, user B inputs the English answer "fine". English translation section 3b analyzes this answer and finds that the answer does not have a subject. Therefore, section 3b sends a request signal to translation information supply section 7. On receiving the request signal translation information supply section 7 retrieves translated information stored in Japanese translation communication information memory 6b. Section 7 extracts sentence structure information from the newest translated sentence (having the largest sentence number). In that sentence ("How is the weather?"), "weather" is the subject. This structure information, "Subject=weather", is sent to English translation section 3b. By using this information, from among "SUBARASHII", "HARE" and "GENKI" (all translated word candidates (Japanese) for "fine"), English translation section 3b selects "HARE" (which is the only word related to the weather in Japanese) and generates the Japanese answer "HARE DESU".

If the newest translated sentence had been "How are you?", section 3b would have selected "GENKI" (which is the only word of the possibilities related to health in Japanese) and would have generated the Japanese answer "GENKI DESU".

Figure 4C:
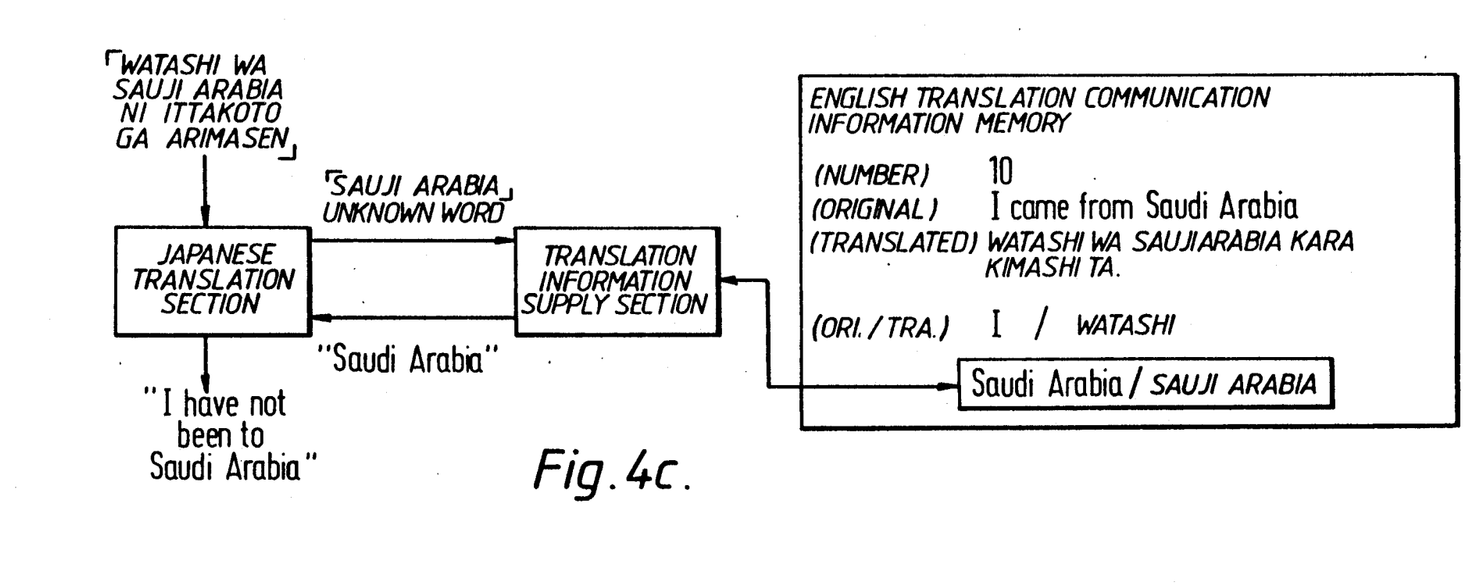

Lastly, as a third example in FIG. 4(c), user B inputs "I came from Saudi Arabia." and its translated result (Japanese) "WATASHI WA SAUJIARABIA KARA KIMASHITA." is displayed on user A's display section. After looking at this Japanese sentence, user A inputs "WATASHI WA SAUJIARABIA NI ITTAKOTO GA ARIMASEN.". If Japanese translation section 3a cannot find the translation for "SAUJIARABIA" in its Japanese-English dictionary, the section 3a sends to translation information supply section 7 a request signal that "SAUJIARABIA" is an unknown word. Thereupon, section 7 retrieves translated information stored in English translation communication information memory 6a by extracting the original word/translated word pair "SAUJIARABIA-Saudi Arabia" and sending this information to Japanese translation section 3a. By using this information, Japanese translation section 3a generates the English sentence "I have not been to Saudi Arabia."

In the present invention, translation information supply section 7 retrieves information stored in translation communication information memory 6 when a more simple translation using the dictionaries of translation section is not possible or adequate. The information (for example, an original word/translated word pair) is supplied to translation section 3 for selecting an adequate translated word. This information is derived from a prior portion of the conversation which has been stored along with its translation. Therefore, translation section 3 can determine an adequate translated word and the quality of translation is extremely improved. Accordingly, several users can communicate with each other smoothly.

Moreover, the present invention is not limited to the above embodiment. For example, in the above embodiment, the translation section, having both functions for translating Japanese into English and for translating English into Japanese, is equipped at one side's communication terminal. It is possible that one side's terminal be equipped with a translation section having one function and another side's terminal be equipped with a translation section having the other function. In this case, the translation communication information memory can be equipped at only one terminal or can be decentralized at both terminals. In short, if the necessary information is transferred through a communication section, it is possible to perform processing as described with respect to the above embodiment.

With a communication system including a host with a translation function between terminals, the host may be equipped with a translation communication information memory and translation information supply section. In short, components of the present invention can be placed in any variety of configurations.

The above embodiment is explained in reference to translation between English and Japanese. However, the present invention can be applied to translation between other languages.

Although only a few exemplary embodiments of this invention have been described in detail above, those skilled in the art will readily appreciate that many modifications are possible in the preferred embodiments without materially departing from the novel teachings and advantages of this invention. Therefore, all such modifications are intended to be included within the scope of this invention as defined by the following claims.

What is claimed is:

1. A translation communication system having translation means for translating a first language into a second language, comprising:
   memory means for storing previous translated sentences and translated information obtained from previous communications over said translation communication system, said translated information being derived from said previous translated sentences, said previous translated sentences having at least a portion in said first language and said translated information having portions corresponding to said first and second languages; and
   supply means for: (1) searching the previous translated sentences in said first language from said memory means for input words in an input original sentence in the first language; (2) when said input words are found in said previous translated sentences, identifying translated information corresponding to said found previous translated sentences and relating to said input words; and (3) supplying said translated information in said second language corresponding to said identified translated information to said translation means as translation information.

2. The translation communication system as claimed in claim 1 wherein said translated information includes sentence structure information of the corresponding previous translated sentence.

3. The translation communication system as claimed in claim 2 wherein said supply means also extracts said sentence structure information corresponding to said previous translated sentence from communications immediately previous to said input original sentence when said input original sentence is not a complete sentence.

4. A translation communication system as claimed in claim 1 wherein said memory means stores said previous translated sentences including corresponding original sentences in said second language from previous communications in said first language, translated information including original words in said second language and corresponding translated words in said first language.

5. The translation communication system as claimed in claim 4 wherein said translated information includes sentence structure information of the corresponding previous translated sentence.

6. The translation communication system as claimed in claim 5 wherein said supply means also extracts said sentence structure information corresponding to said previous translated sentence from communications immediately previous to said input original sentence when said input original sentence is not a complete sentence.

7. The translation communication system as claimed in claim 4 wherein each of said previous translated sentences has a sentence number indicative of the order of said previous communications from which said previous translation sentences are obtained.

8. The translation communication system as claimed in claim 7 wherein said supply means searches said previous translated sentences starting with said previous translated sentence corresponding to the most recent previous communication and then successively earlier previous communications as identified by said sentence number.

9. A system a in claim 1, wherein said memory means stores all of the most recent sentences in a communication.

10. The translation communication system as claimed in claim 9 wherein said supply means matches individual words of said previous translated sentences with selected individual input words of said input original sentence.

11. The translation communication system as claimed in claim 9 wherein said translation means includes a dictionary and said translation communication system causes said supply means to identify said translated information corresponding to an input word of the input original sentence not included in said dictionary.

12. The translation communication system as claimed in claim 9 wherein each of said previous translated sentences has a sentence number indicative of the order of said previous communications from which said previous translated sentences are obtained.

13. The translation communication system as claimed in claim 12 wherein said supply means searches said previous translated sentences starting with said previous translated sentence corresponding to the most recent previous communication and then successively earlier previous communications as identified by said sentence number.

14. A translation communication system having first translation means for translating a first language into a second language, and second translation means for translating the second language into the first language, comprising
   first memory means for storing previous original sentences from previous communications in said second language and corresponding translated sentences translated by said second translation means into said first language, and translated information for each of said previous original sentences and corresponding translated sentences, including previous original words in said previous original sentences and translated words in said translated sentences corresponding to said previous original words, respectively;
   second memory means for storing previous original sentences from previous communications in said first language and corresponding translated sentences translated by said first translation means into said second language, and translated information for each of said previous original sentences and corresponding translated sentences, including previous original words in said previous original sentences and translated words in the translated sentences corresponding to said previous original words, respectively; and
   supply means for: (1) searching said translated sentences in said first language from said first memory means for input words in an input original sentence in said first language; (2) when the input words are found in said translated sentences, identifying translated information corresponding to the found translated sentence and relating to the input words; (3) supplying said translated information in said second language corresponding to said identified translated sentence to said first translation means as translation information in said second language; (4) searching said translated sentences in said second language from said second memory means for input words in an input original sentence in said second language; (5) when the input words are found in said translated sentences, identifying translated information corresponding to said translated sentence and relating to the input words; and, (6) supplying said translated information in said first language corresponding to said identified translated sentence to said second translation means as translation information in said first language.

15. The translation communication system as claimed in claim 14 wherein said translated information in said first memory means includes sentence structure information of the correspondent translated sentence in said first language, and said translated information in said second memory means includes sentence structure information of the correspondent translated sentence in said second language.

16. The translation communication system as claimed in claim 15 wherein said supply means also extracts said sentence structure information corresponding to said previous translated sentence from communications immediately previous to said input original sentence when said input original sentence is not a complete sentence.

17. The translation communication system as claimed in claim 14 wherein said first and second translation means include dictionaries respectively, and said translation communication system causes said supply means to identify said translated information corresponding to an input word of the input original sentence not included in said dictionaries.

18. The translation communication system as claimed in claim 14 wherein each of said previous original sentences has a sentence number indicative of the order of said previous communications from which said previous original sentences are obtained.

19. The translation communication system as claimed in claim 18 wherein said supply means searches the translated sentences starting with the most recent previous communication and then successively earlier previous communications as identified by said sentence number.

20. A translation communication system,, comprising:
means for receiving information in a first language to be translated to a second language;
memory means for storing previous original information in one of said first and second languages and corresponding translated information in the other of said first and second languages;
means for detecting a condition which will make translation difficult, in said information in said first language, wherein said condition is a word which cannot be translated into said second language;
means for consulting said stored previous original information and corresponding translated information to determine if said stored previous information includes information which can be used to resolve said condition; and
a dictionary which is being used for translation, wherein said word is one which is not in said dictionary.

21. A system as in claim 20 wherein said previous information in said storing means is analyzed to determine if said word not in the dictionary has been translated from said second language to said first language previously.

22. A translation communication system, comprising:
means for receiving information in a first language to be translated to a second language;
memory means for storing previous original information in one of said first and second languages and corresponding translated information in the other of said first and second languages;
means for detecting a condition which will make translation difficult, in said information in said first language; and
means for consulting said stored previous original information and corresponding translated information to determine if said stored previous information includes information which can be used to resolve said condition, wherein said condition is a sentence which is not complete, and said consulting means completes said sentence using syntax of said previously stored sentences.

* * * * *